Patented July 22, 1947

2,424,408

UNITED STATES PATENT OFFICE 2,424,408

PREPARATION OF PEANUT PROTEIN

Sarah Neilson McGeoch, Greenford, England, assignor to Imperial Chemical Industries Limited, a corporation of Great Britain No Drawing. Application November 22, 1944, Serial No. 564,719. In Great Britain December 6, 1943

4 Claims. (Cl. 106—154)

1

The present invention relates to an improved method for the production of peanut globulin adapted for use in the preparation of viscous alkaline solutions of substantial globulin concentration such as are used for the production of artificial protein filaments by wet spinning, and to the preparation of improved alkaline solutions of peanut globulin as aforesaid.

For the extraction of vegetable seed globulins from the seed material containing them, which in the case of peanut globulin is usually a meal from which the oil has already been substantially removed, it is frequently the practice to employ aqueous alkaline solutions, as these are capable of extracting a higher yield of the globulins than are neutral solvents. The higher the alkalinity, however, the more noticeable is the chemical attack on the protein as evidenced by the liberation of ammonia from it, and the concentrations of caustic alkali employed for alkaline extraction have therefore always been low, in order to minimise the destruction of the protein. Moreover, an objectionable colouring matter derived from the fragments of the reddish brown testa of the peanut is extracted from the substantially oilfreed peanut meal unless the alkalinity is very low indeed, and in order to prevent the formation of a strongly coloured extract it has been proposed to carry out the alkaline extraction in such a manner that the pH of the solution is at no period allowed to exceed 8 to 8.5 in the course of the extraction, but even when blanched peanuts are used the pH of the extract is not usually allowed to rise to any substantially higher value.

In the viscous alkaline solutions employed for the production of the protein filaments, however, it is necessary that the alkalinity should be sufficient to bring about a certain modification of the molecular structure of the globulins, and for the production of artificial filaments by wet spinning from peanut globulins it is desirable that the pH of the solution to be spun should be at least 12.5 when it is freshly made up, or at least that in the course of the preparation of the viscous spinning solution the globulins should be exposed for a period of time to such alkalinity. Owing to the acidic nature of the globulins and the higher concentration in which they are present, very substantially higher concentrations of sodium hydroxide are required to make up the viscous spinning solutions than to extract the globulins in the first place from the peanut meal.

In the viscous alkaline spinning solution hitherto prepared from peanut material difficulty has been caused by a surface gelation which may interfere with the continuity of such operations as the extrusion of a batch of the solution from a containing vessel, through the narrow orifice, or may adversely affect the quality of the product coagulated from the extruded solution. This sur-

2 face gelation, which may commence very soon after the solution has been prepared, begins at the interface where the liquid is exposed to the atmosphere and gradually spreads into the body of the solution; it is most severe at the interface. The only method of preventing or delaying surface gelation hitherto proposed is that described in R. H. K. Thompson U. S. Patent No. 2,381,088, according to which a partial pressure of the ammonia is maintained over the globulin solution, this ammonia pressure being substantially in excess of that due to incipient hydrolysis by the alkali present in the solution.

We have now found that the liability of the alkaline spinning solutions to surface gelation is connected not only with factors, such as the presence therein of air bubbles, that affect the magnitude of the surface, but also with the alkalinity conditions prevailing during the alkaline extraction in the isolation of the globulins from the peanut material, and with the presence of the of the testa of the nut during the last mentioned operation; and that by carrying out the isolation of the globulins under suitable conditions the necessity for maintaining an ammonia pressure over the deaerated viscous spinning solutions obtained from the resulting globulins may be avoided.

While the alkalinity conditions prevailing during the extraction of the globulins from the peanut material in presence of the material of the testa visibly affect the extent to which the colouring material from the testa darkens the extract and stains the globulins precipitated therefrom by acidification, the relationship between the alkalinity conditions and the presence of the testa and the liability of spinning solutions made from the subsequently isolated globulins to undergo surface gelation has not hitherto been recognised. We have found, however, that there is a minimum extraction alkalinity above which the resulting isolated globulins are usefully free from the disadvantage of yielding spinning solutions liable to surface gelation, but that there is present in the testa a substance promoting surface gelation that will be extracted from the testa material by such minimum extraction alkalinity and cause the globulins to yield solutions liable to surface gelation, and further that this minimum extraction alkalinity is sufficient also to extract the colouring matter strongly from the testa and yield badly discoloured globulins.

According to the present invention the method for the production of peanut globulin comprises extracting the globulin from comminuted peanut material containing no appreciable amount of fragments of testa by treating the said peanut material with a dilute alkaline solution of such concentration and in such manner that a pH of at least 11.0 is maintained during the said extraction, separating the alkaline extract from undissolved matter, and thereafter precipitating the globulins from the alkaline extract, as by acidifying the said extract to the isoelectric region of the globulins.

In order to minimise the chemical attack on the globulins it is preferred that they should not be exposed in the aforesaid operations in the dissolved condition to an alkalinity higher than 11.5 for any substantial period of time.

In putting the invention into effect, sodium hydroxide may conveniently be employed as the alkali; potassium hydroxide may also be used, but mild alkalis are ineffective. More generally it may be stated that the alkali must be capable of yielding an aqueous solution of pH at least approximately 12.7 in the absence of the peanut material, for the globulins depress the pH of the extracting liquid very noticeably. The weight of the extracting alkaline solution should be several times, as for example at least seven times, that of the peanut material to be extracted and preferably the total quantiy of alkali required should be added quickly and in one stage. Preferably also the oil as well as the material of the testa is substantially removed before the alkaline extraction is commenced. Preferably all the operations incident to the isolation of the globulins from the peanut are conducted at temperatures not exceeding 40° C.

The removal of the testa may be accomplished by mechanical action and winnowing or the like, and its detachment from the peanut may be effected before, or during, or partly before and partly during the comminution of the nuts. The testa is loosened or detached by the machine used to commence the comminution of the peanuts, and provided its action is not so severe as to rupture the cells sufficiently to cause excessive exudation of oil, the fragments of the testa can easily be blown away. Comminution of the peanuts in stages with intermediate blowing is therefore an effective way of removing the testa material.

The invention is illustrated in the following example, in which the parts are parts by weight:

Example

The de-oiled peanut material containing no appreciable amount of testa material is prepared as follows:

Peanuts are cracked into halves by passing them through loosely set rollers, and cracked nuts are crushed by passing them through more closely set rollers, and blown in a draught as they come through. The crushing and blowing are repeated with still more closely set rollers, and the product is then placed on a vibrating screen while air is sucked through it. By these operations the fragments of the testa are eliminated. The product is next extracted several times with petrol until it is substantially free from oil, and the residual petrol is evaporated away, these operations being conducted at temperatures not exceeding 40° C. The meal is then ground to a finer grist if this is necessary.

One part of the resulting meal is then moistened with water and rapidly mixed with a sodium hydroxide solution which, when the water used for the moistening of the meal is allowed for, has a concentration of 0.2% and amounts to 10 parts. The mixture is stirred for an hour, and is then centrifuged and filtered. The resulting clear extract, which has a pH of 11.0 to 11.2, as measured by a pH meter or an indicator, is then acidified to approximately a pH of 5 by means of sulphur dioxide and allowed to settle. The liquor is siphoned off from the precipitated globulins and replaced by fresh water. The product is centrifuged, and again washed and centrifuged. It is then finally dried off with acetone if it is not intended to make it up into an alkaline spinning solution immediately. Deaerated solutions made up from the product with concentrations of the protein and of sodium hydroxide adapted to give spinnable viscosities on ageing can be introduced as required into the vessel from which they are forced through the spinneret without interruptions for cleaning out the vessel between each addition necessitated by surface gelation.

I claim:

1. A method for the production of viscous spinnable alkaline solutions of substantial concentration of undenatured peanut globulin possessing substantial freedom from surface gelation which comprises the steps of extraction of the globulins from comminuted peanut material containing no appreciable amount of testa material by treatment of said peanut material at a temperature not exceeding 40° C. with an extraction solution consisting of a strong alkali from the group consisting of sodium hydroxide and potassium hydroxide dissolved in water with the concentration of the alkali arranged so that the pH value of the solution is maintained between about 11.0 and 11.5 in said solution during said extraction, separation of the alkaline extract from undissolved matter, precipitation of the globulins from the alkaline extract at a temperature not exceeding 40° C., separation of the precipitated globulins from the precipitation medium, and solution of said separated globulins without subjection to any denaturing step in an alkaline solution, whereby a globulin solution of spinnable viscosity on ageing is produced.

2. The process of claim 1 wherein the weight of the extracting alkaline solution is at least seven times that of the peanut material to be extracted.

3. The process of claim 1 wherein said precipitation is accomplished by acidification of the alkaline extract to the iso-electric region of the globulins.

4. An aqueous alkaline solution of substantially undenatured peanut globulins substantially free from surface gelation tendencies which may be spun into artificial protein filaments as prepared in accordance with the process of claim 1.

SARAH NEILSON McGEOCH.

REFERENCES CITED

The following references are of record in the file of this patent:

UNITED STATES PATENTS

| Number | Name | Date |
| --- | --- | --- |
| 1,955,375 | Cone et al. | Apr. 17, 1934 |
| 2,194,835 | Nickerson | Mar. 26, 1940 |
| 2,233,213 | Kniseley et al. | Feb. 25, 1941 |
| 2,233,439 | Wahlforss et al. | Mar. 4, 1941 |
| 2,238,329 | Julian et al. | Apr. 15, 1941 |

OTHER REFERENCES

Burnett et al., Ind. and Eng. Chem. (March 1944), pages 284–288.